United States Patent [19]

Kaneko

[11] Patent Number: 5,565,941
[45] Date of Patent: Oct. 15, 1996

[54] HOT SHOE SYSTEM FOR CAMERA

[75] Inventor: Hidefumi Kaneko, Tokyo, Japan

[73] Assignee: Asahi Kogaku Kogyo Kabushiki Kaisha, Tokyo, Japan

[21] Appl. No.: 356,570

[22] Filed: Dec. 15, 1994

[30] Foreign Application Priority Data

Dec. 29, 1993 [JP] Japan .................. 5-074665 U

[51] Int. Cl.⁶ .................................. G03B 15/03
[52] U.S. Cl. .................. 396/177; 396/155; 396/198
[58] Field of Search ................................ 354/132, 141, 354/145.1, 149.11

[56] References Cited

U.S. PATENT DOCUMENTS

| | | |
|---|---|---|
| 3,712,197 | 1/1973 | Wagner . |
| 4,893,140 | 1/1990 | Yamamoto et al. . |
| 4,910,542 | 3/1990 | Yamamoto et al. . |
| 5,159,379 | 10/1992 | Shirane . |
| 5,329,327 | 7/1994 | Arai et al. . |

FOREIGN PATENT DOCUMENTS

| | | |
|---|---|---|
| 2-48645 | 2/1990 | Japan . |
| 2-53038 | 2/1990 | Japan . |

*Primary Examiner*—Monroe H. Hayes
*Attorney, Agent, or Firm*—Greenblum & Bernstein P.L.C.

[57] ABSTRACT

A pop-up internal strobe unit of a camera is enabled when a hot shoe cover is inserted into a hot shoe, or if the hot shoe is empty, and is disabled when an external strobe is mounted in the hot shoe. The enabling and disabling of the pop-up internal strobe unit is controlled by operation of a switch extending into the hot shoe region. The switch is not actuated, thus enabling operation of the pop-up internal strobe unit, when a matched recess provided in the hot shoe cover is inserted into the hot shoe. The switch is actuated, thus disabling operation of the pop-up internal strobe unit operation, when an external strobe is mounted in the shoe.

20 Claims, 6 Drawing Sheets

HOT SHOE SYSTEM FOR CAMERA

BACKGROUND OF THE INVENTION

The present invention relates to cameras having an internal strobe, and more specifically, to devices for disabling the internal strobe when an external strobe unit is attached to the camera.

Modern cameras may be built with a pop-up internal strobe unit. Such an internal strobe unit typically has a limited range, and a camera may have some provision for attaching a generic or dedicated external strobe unit. Frequently, a hot shoe is provided to the camera body for mounting and controlling the external strobe. The hot shoe is conventionally provided close to the pop-up strobe.

However, modern cameras may also be constructed with a contoured body and a recessed hot shoe, and have a hot shoe cover for protecting the hot shoe and for preserving the contour of the camera body. The hot shoe cover is mounted to the hot shoe in a like manner to an external strobe coupling mount.

When a camera has a pop-up strobe located next to the hot shoe, if the strobe is popped-up when the external strobe is mounted, the pop-up and external strobes interfere with each other. A camera may suppress the pop-up of an internal strobe when an external strobe is mounted. However, such a camera, unable to discriminate between the hot shoe cover and an external strobe unit, is not able to control the pop-up of the internal strobe according to the mounted part. If such provision is not included, the internal strobe may be disabled inappropriately if a hot shoe cover is mounted in the hot shoe.

SUMMARY OF THE INVENTION

It is therefore an object of the present invention to provide a camera having a hot shoe system able to discriminate between the mounting of a hot shoe cover and of an external strobe, and which can selectively disable an internal strobe unit based upon which of the cover or external strobe is mounted thereon.

According to one aspect of the present invention, a hot shoe system for a camera having a pop-up internal strobe unit positioned on the camera proximate to a hot shoe for mounting an external strobe may include a device for determining if a hot shoe cover or an external strobe unit is inserted in a hot shoe and a device for suppressing at least one operation of the internal strobe unit when a coupling base of the external strobe unit is inserted in the hot shoe and for enabling the at least one operation of the internal strobe unit when the hot shoe cover is inserted in the hot shoe. Preferably, the operation is a pop-up operation of an internal strobe. Further preferably, the device for suppressing and for enabling at least one operation of the internal strobe unit further enables said at least one operation of the internal strobe unit when the hot shoe is empty. Still further preferably, the means for suppressing and for enabling at least one operation of the internal strobe may include a controller and a pop-up actuator controlled by the controller, the pop-up operation being actuated by the pop-up actuator, the controller may enable the pop-up actuator to actuate the pop-up operation when the hot shoe cover is inserted in the hot shoe or the hot shoe is empty, and the controller may disable the pop-up actuator from actuating the pop-up operation when the external strobe is inserted in the hot shoe. The means for suppressing and for enabling at least one operation of the internal strobe preferably includes a detection switch provided to said hot shoe, and the detection switch may include a pin extending into the hot shoe and a resilient contact switch actuatable by moving the pin from a neutral position. The hot shoe cover is preferably shaped to avoid the pin when the hot shoe cover is inserted into the hot shoe.

According to another aspect of the present invention, a hot shoe system for a camera having a pop-up internal strobe unit positioned on the camera proximate to a hot shoe for mounting an external strobe may include a switch provided to the hot shoe, a hot shoe cover, insertable into the hot shoe, having a recess, an external strobe unit having a coupling base, insertable into the hot shoe; and a device for activating the internal strobe responsive to the switch. The switch may be arranged such that the switch maybe not actuated when the hot shoe cover is inserted into the hot shoe, the switch maybe arranged such that the switch may be actuated when the coupling base of the external strobe unit is inserted into the hot shoe, and the activating means may deactivate the internal strobe when the switch is actuated, and may activate the internal strobe when the switch is unactuated. Preferably, the means for activating the internal strobe extends the internal strobe away from a body of the camera when the internal strobe is activated. Further preferably, the switch may include a pin extending into the hot shoe; a resilient contact switch actuatable by moving the pin from a neutral position, and the device for activating maybe enabled when the pin is in the neutral position and maybe disabled when the pin is moved from the neutral position.

DETAILED DESCRIPTION OF THE PREFERRED EMBODIMENTS

Figure 1:
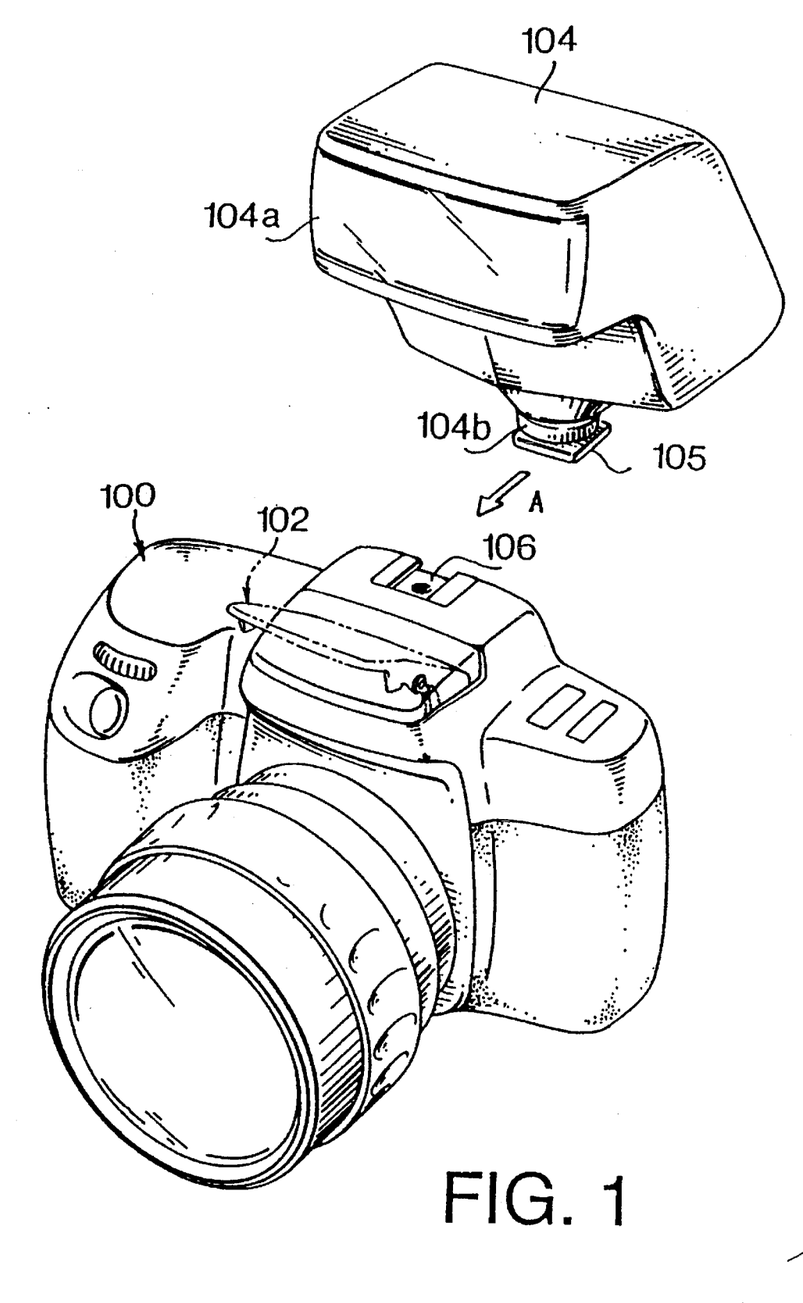
FIG. 1 is a perspective view of a camera and external strobe unit to which the present invention is applied.

As shown in FIG. 1, a camera 100 having an internal strobe 102 is a single lens reflex (SLR) camera. The internal strobe 102 is actuated to pop up by a pop-up button 109 (shown in FIG. 7, but not depicted in FIG. 1) on the camera body. A hot shoe 106 is provided to the camera 100 for mounting and controlling either a generic or a dedicated external strobe 104. The external strobe 104 has a light-emitting portion 104a, and a mounting base 105 for coupling to the hot shoe 106. When coupled via the hot shoe 106 and mounting base 105, the camera 100 may control the external strobe unit 104 by means of matching electrical contacts (not shown) provided to both the hot shoe 106 and the strobe mounting base 105. To couple the external strobe unit 104 to the hot shoe 106, the mounting base 105 of the strobe 104 slides into the hot shoe 106 from the rear of the camera 100, in the direction shown by the arrow A.

Figure 2:
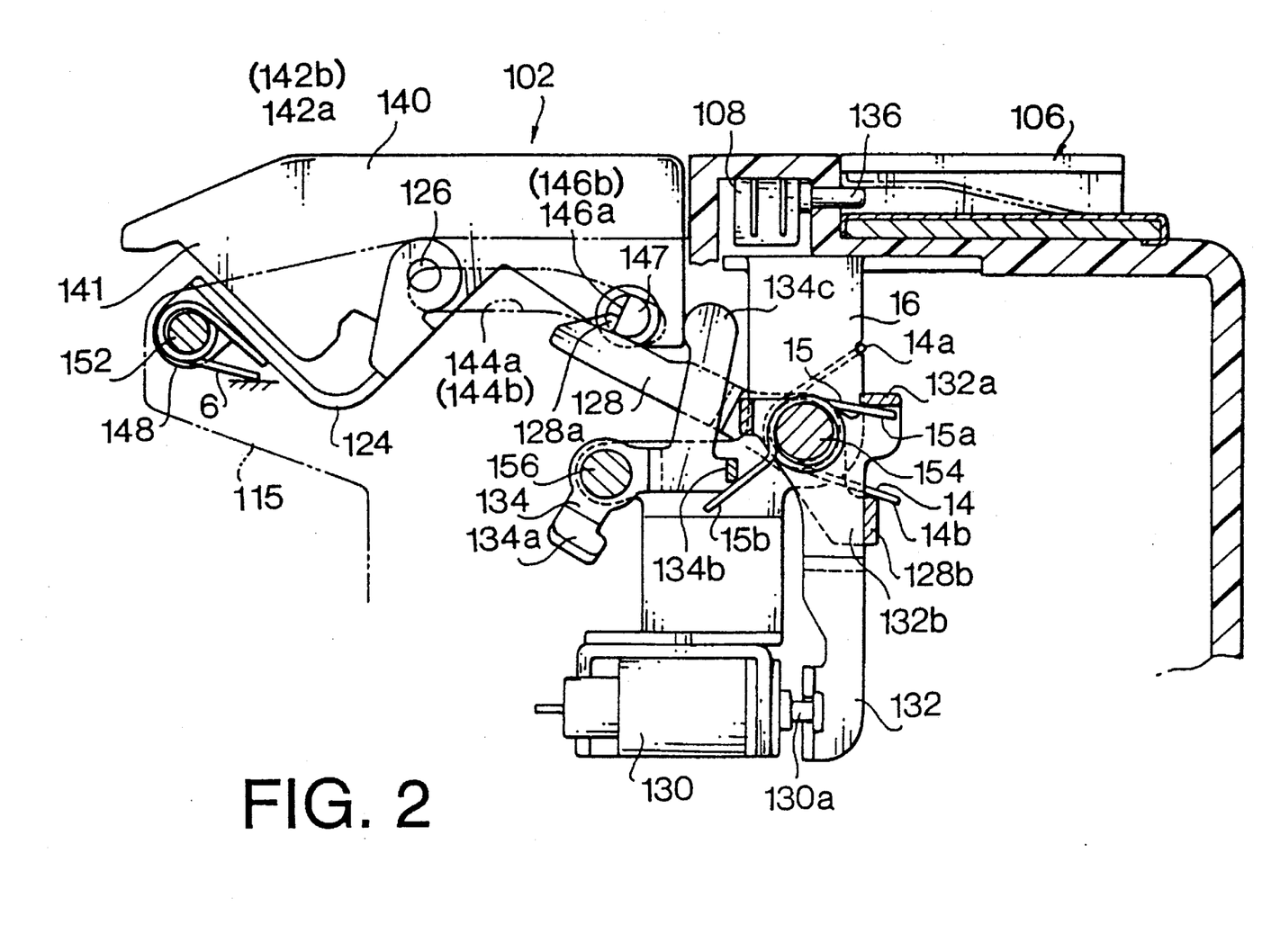
FIG. 2 is an internal view of a first embodiment of a hot shoe system, showing a first state.
Figure 3:
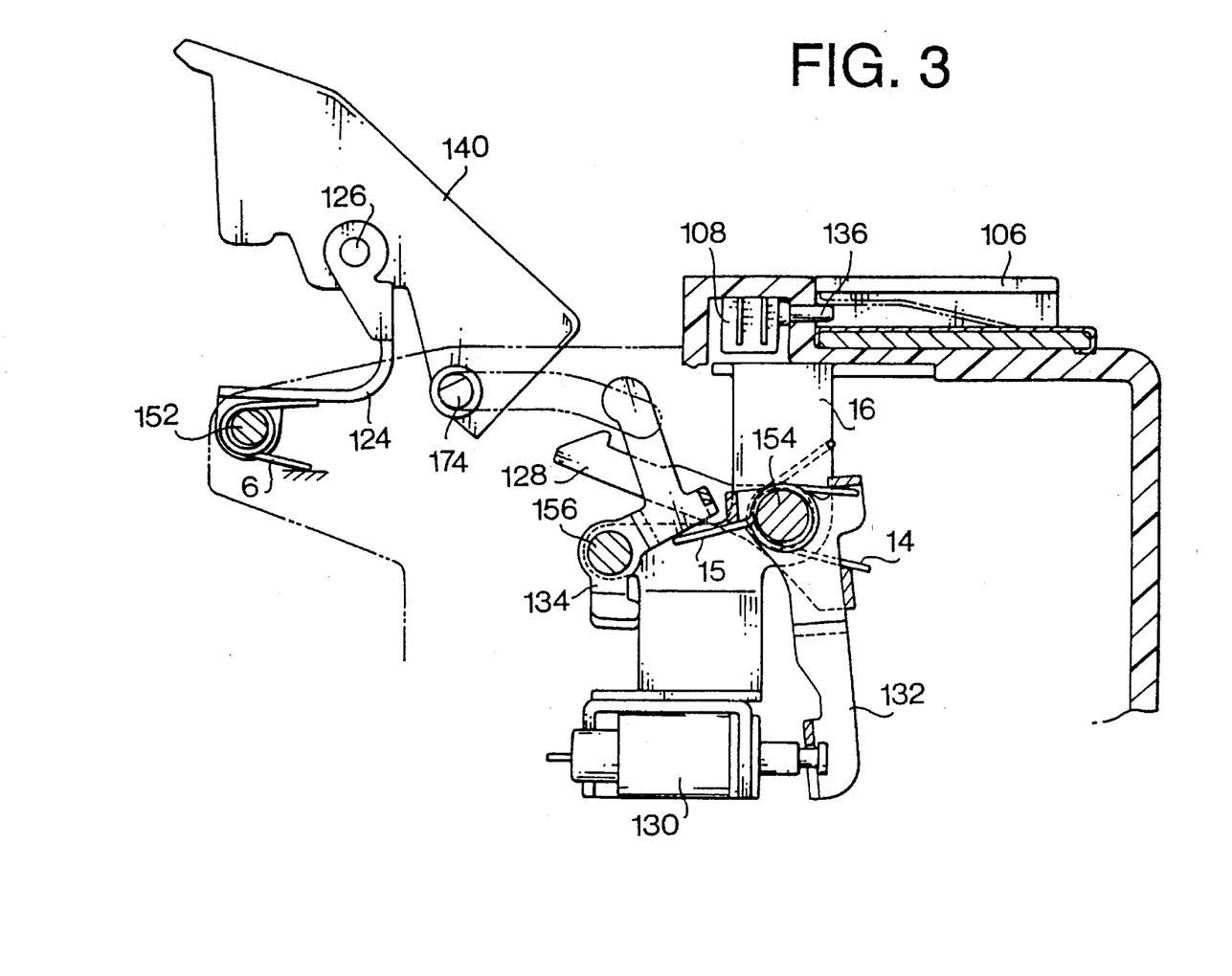
FIG. 3 is an internal view of an internal strobe portion of the first embodiment of the hot shoe system, showing a second state.

FIGS. 2 and 3 are internal views of the internal strobe portion of the hot shoe system of the camera 100, showing a pop-up mechanism in detail in two states.

As shown in FIG. 2, a strobe head 140 has cam follower pins 146a and 146b on its respective left and right sides 142a and 142b. Guide grooves 144a and 144b for guiding the cam follower pins 146a and 146b, respectively, are provided to an upper cover 115 of the camera 100. An L-shaped connecting arm 124 is attached to a pivotable mount 148 at an end of one leg of the L shape, and the pivotable mount 148 is pivotable about pivot 152 provided to the upper cover 115. The pivotable mount 148 and connecting arm 124 are biased to rotate in a counterclockwise direction by a torsion spring 6 provided to the axis 152 and having a connection to the upper cover 115. The L-shaped connecting arm 124 is further rotatably attached, at an end of the remaining leg of the L shape, to a pin 126 provided on the left side 142a of the strobe head 140.

A lock recess portion 147 is provided to the cam follower pin 146a on the left side 142a of the strobe head 140. As shown in FIG. 2, the lock recess portion 147 mates with a catch 128a of a catch lever 128 when the strobe head 140 is in a "down" position. The catch lever 128 is pivotable about an axis 154, and is biased to rotate in a clockwise direction by a torsion spring end 14b of a torsion spring 14 provided to the axis 154. The remaining end 14a of the torsion spring 14a engages a support frame 16, and the support frame 16 supports the axes 154 and 156. The catch lever 128 further comprises a connecting tab 128b at an opposite end to the catch 128a, and the connecting tab engages an engaging portion 132b of a link lever 132 in such a manner that the link lever 132 may push the catch lever 128 counterclockwise.

The link lever 132 is also pivotable about the axis 154, and is linked to a solenoid-like electromagnet 130 by means of a plunger 130a inserted in a chamber through the coils (not shown) of the electromagnet. The electromagnet has a permanent magnet (not shown) attached therewith at one end of the chamber. The plunger 130a can be pushed away from the permanent magnet when the electromagnet 130 is energized, and pulled towards the permanent magnet when the electromagnet 130 is de-energized. When the plunger 130a of the electromagnet 130 is extended (FIG. 3), it pushes the link lever 132 counterclockwise, and when the plunger 130a returns (FIG. 2), the link lever 132 is moved clockwise and then held in place by the attraction between the permanent magnet and the plunger 130a. As previously described, an engaging portion 132b of the link lever 132 is arranged such that the engaging portion 132b can push the catch lever 128 counterclockwise. The link lever 132 further comprises a bent tab 132a, which engages a torsion spring end 15a of a torsion spring 15 provided to the axis 154.

The torsion spring 15 can be "charged" (deflected under load) in a counterclockwise direction at a remaining end 15b by a tab portion 134b of a pusher arm 134. However, the end 15b of the torsion spring 15 is only charged by the bent tab 134a (as end 15a is held at tab portion 132b) when the internal strobe 102 is in a "down" position as shown in FIG. 2. In an "up" position, the pusher arm 134 and link arm 132 are rotated such that the torsion spring 15 is not under load from either the bent tab 132a or tab portion 134b.

The pusher arm 134 is rotatably provided to the axis 156, and comprising a stopper portion 134a, a tab portion 134b, and a pusher portion 134c. The stopper portion 134a limits the rotational range of the pusher arm 134 by stopping the pusher arm 134 against the support frame 16 when the internal strobe is in the "up" position as shown in FIG. 3. The tab portion 134b contacts the end 15b of the torsion spring 15 (FIG. 2), and the torsion spring is pushed and charged by the pusher arm 134 in a counterclockwise direction, but only when the internal strobe 102 is in a "down" position as previously described. The pusher portion 134c follows the strobe head 140 (FIG. 2), with a slight pushing force from the bias of the torsion spring 15, when the strobe head 140 is moved to an "up" position by the torsion spring 6.

Figure 4:
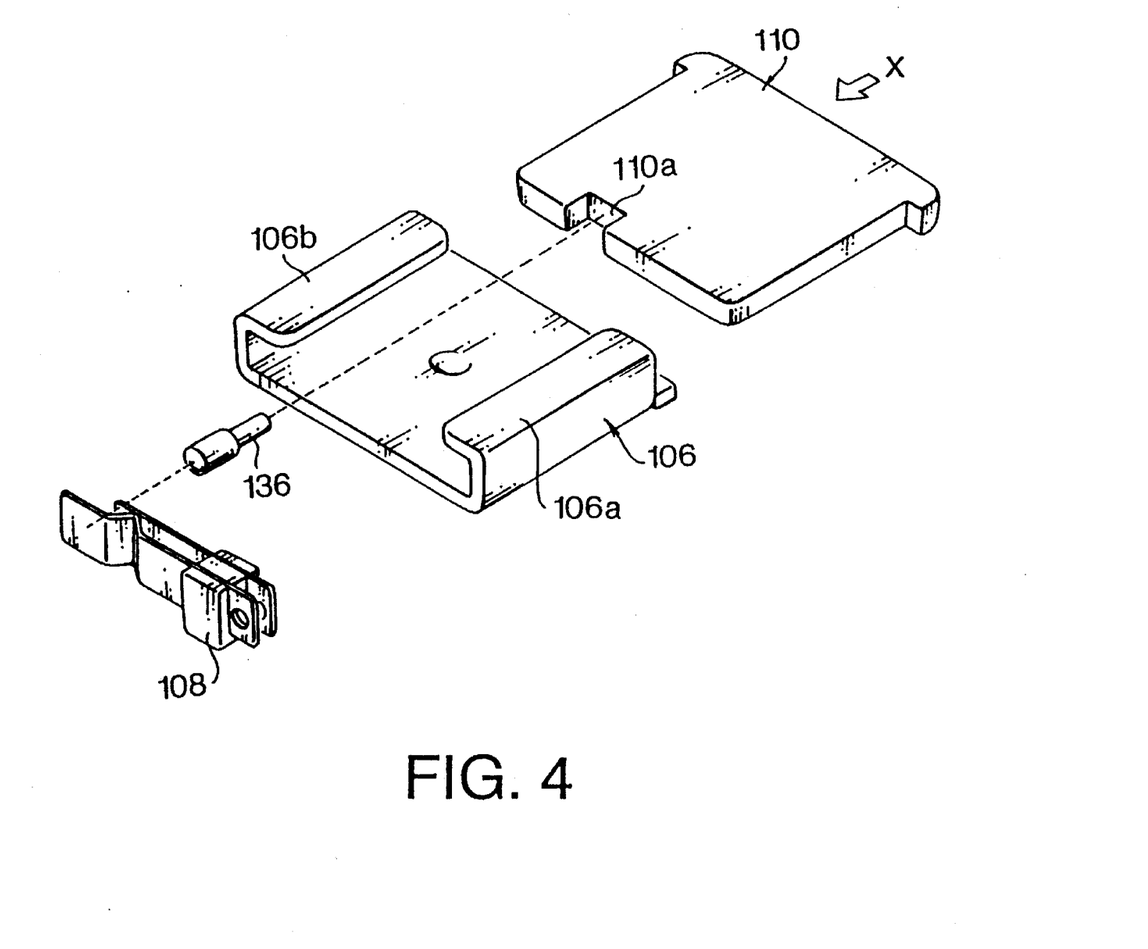
FIG. 4 is a perspective view of a hot shoe portion of the first embodiment of the hot shoe system.

The hot shoe 106 is visible in profile in FIGS. 2 and 3. A contact switch 108 is provided in the camera 100, adjacent to and in front of the hot shoe 106, and a switch pin 136 extends from the contact switch 108 into the hot shoe 106. The switch pin 136 is supported by the camera 100 body and is slidable in the direction of its axis to depress the contacts of the contact switch 108. FIG. 4 shows the hot shoe arrangement in perspective. A hot shoe cover 110 is formed having a recess 110a, positioned, such that when the hot shoe cover 110 is inserted in direction x into the hot shoe 106, the switch pin 136 fits into the recess 110a, and is therefore not moved and does not actuate the contact switch 108.

Figure 5:
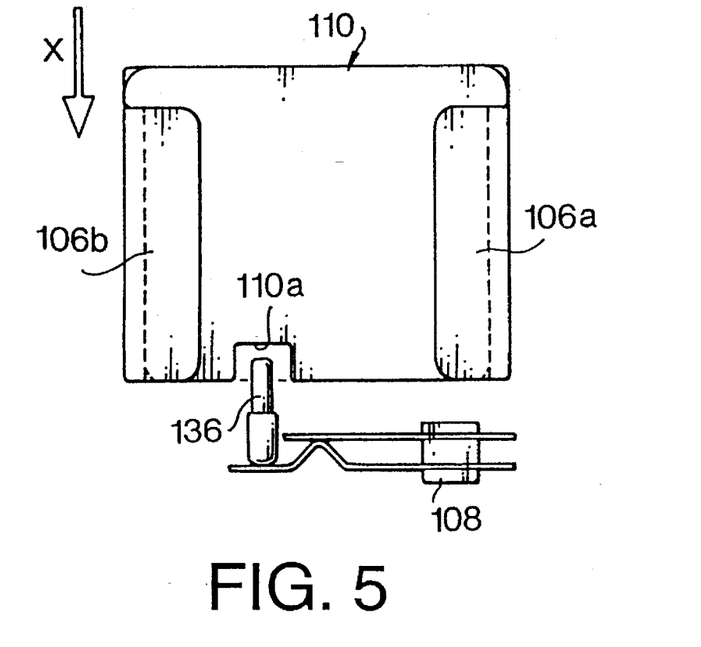
FIG. 5 is a plan view of the hot shoe portion of the first embodiment of the hot shoe system, showing a hot shoe cover mounted in the hot shoe.
Figure 6:
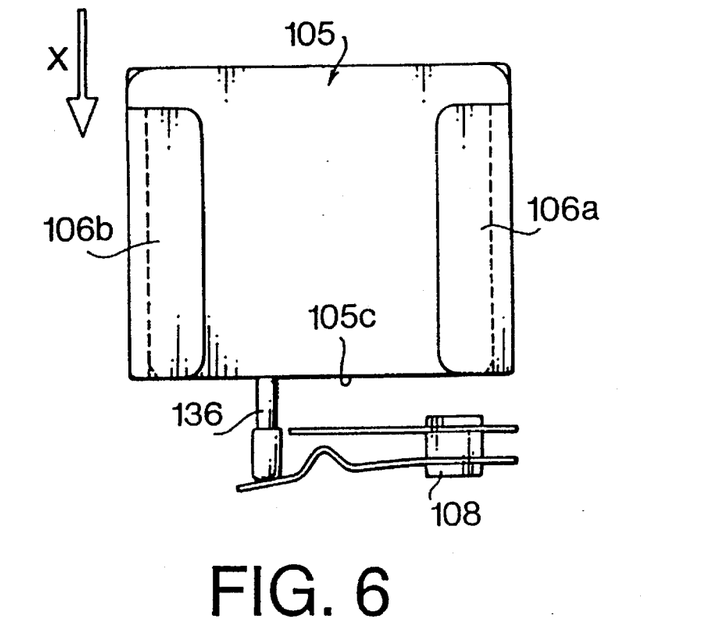
FIG. 6 is a plan view of the hot shoe portion of the first embodiment of a hot shoe system, showing an external strobe coupling mounted in the hot shoe.

The hot shoe 106 is shown in a plan view in FIG. 5, with the hot shoe cover 110 inserted into the hot shoe 106 in direction X. As shown in FIG. 5, the switch pin 136 fits into the recess 110a, and is not actuated by the hot shoe cover 110. Conversely, FIG. 6 shows the hot shoe 106, in plan view, but with the mounting base 105 of the external strobe unit 104 in direction X instead. In this case, the side 105c of the mounting base 105 presses on the switch pin 136, and actuated the contact switch 108, turning the contact switch OFF.

Figure 7:
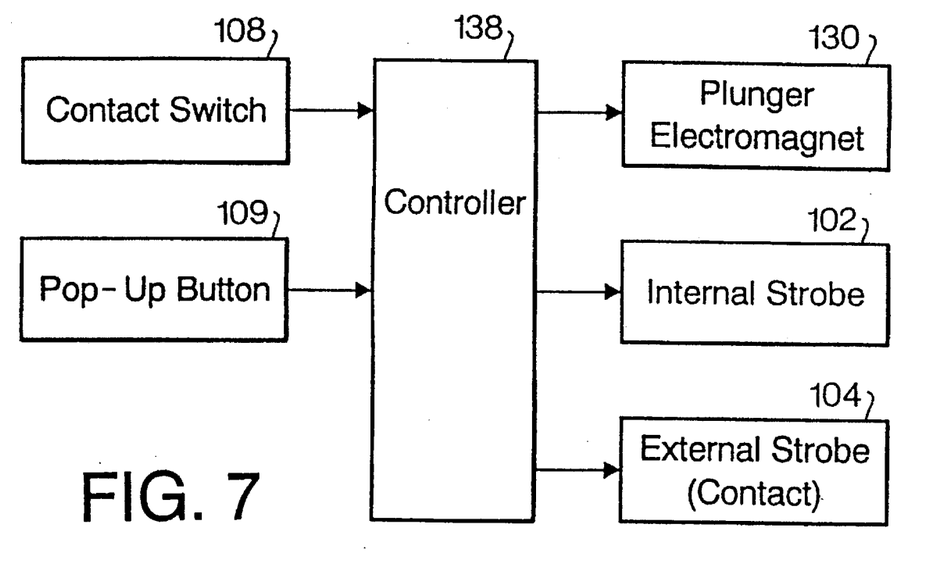
FIG. 7 is a block diagram of a controller for the embodiments of the hot shoe system.

As shown in FIG. 7, a controller 138 is connected to the internal strobe 102, the external strobe (contacts) 104, the electromagnet 130, the pop-up button 109, and the contact switch 108. The controller 138 does not allow the internal strobe 102 to be moved to an "up" position when the contact switch 108 is OFF (external strobe 104 is inserted in the hot shoe 106) by controlling the electromagnet 130. Even if the pop-up button 109 is pressed, the controller 138 keeps the internal strobe 102 in a "down" position.

When the internal strobe 102 is to be moved to the "up" position of FIG. 3 from the "down" position of FIG. 2, the pop-up button 109 is actuated. If the hot shoe cover 110 is inserted in the hot shoe 106, or the hot shoe 106 is empty, the contact switch 108 is not turned OFF by the switch pin 136, and the electromagnet 130 may be operated.

From the position shown in FIG. 2, the next stage of the pop-up operation is shown in FIG. 3. The controller 138 briefly energizes the electromagnet 130, which pushes the plunger 130a away from the electromagnet 130 (and permanent magnet), and the torsion spring 15 carries the link arm 132 in a counterclockwise direction. The catch arm 128 is also moved by the link arm 132 counterclockwise by virtue of the engagement at the engagement portion 132b. The catch 128a of the catch arm releases the lock recess portion 147 of the cam follower pin 146a, and the strobe head 140 "pops" up to the position shown in FIG. 3 as the torsion spring 6 pushes the connecting arm 124 counterclockwise, making the cam follower pins 146a and 146b proceed along the respective cam grooves 144a and 144b. The electromagnet 130 is then de-energized, and the catch arm 128 and link arm 132 then return to the positions shown in FIG. 2, as the permanent magnet of the plunger 130a is attracted to the ferromagnetic portions of the de-energized electromagnet 130, while the pusher arm 134 remains in the position shown in FIG. 3, no longer charging the torsion spring 15. The position of the pusher arm 134 in FIG. 3 defines a standby position where the strobe head 140 maybe re-locked when pushed down as the back of the strobe head is pushed against pusher portion 134c of the pusher arm 134 and the torsion spring 15 is charged and lock recess portion 147 may re-engage the catch 128a of the catch arm 128.

As previously described, if an external strobe 104 is present in the hot shoe 106, then the contact switch 108 is turned OFF by the switch pin 136, and the controller 138 will not energize the electromagnet 130. In this case, the internal strobe 102 will not move to the "up" position, and may not be operated. In such a case, the controller 138 further inhibits the charging of a strobe circuit and capacitor (not shown) associated with the internal strobe 102.

Figure 8:
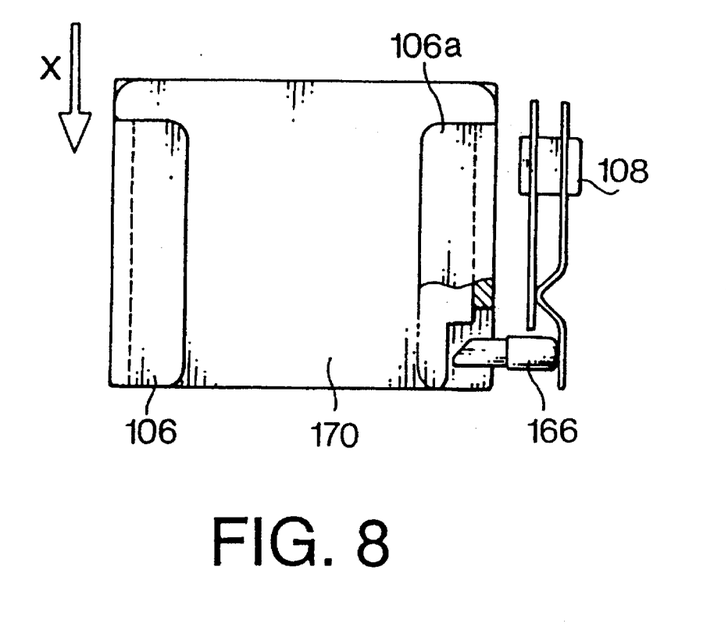
FIG. 8 is a plan view of the hot shoe portion of a second embodiment of the hot shoe system, showing a hot shoe cover mounted in the hot shoe.

A second embodiment is shown in FIG. 8. In this embodiment, the contact switch 108 is placed at the side of the hot shoe 106, and a tapered switch pin 166 is used. In this case, a recess (dotted line) is provided at the side of a hot shoe cover 170. The recess is positioned such that the hot shoe cover does not press on the tapered switch pin 166 when inserted, but an external strobe unit 104 will press on the taper of the tapered switch pin 166 and turn the contact switch 108 OFF. Otherwise, the operation of the second embodiment is identical to that of the first.

Thus, the embodiments of a hot shoe system as described are able to allow the camera 100 to determine whether an internal strobe 102 is to be activated or suppressed. Furthermore, the popping-up operation of a pop-up internal strobe 102 is suppressed when an external strobe is mounted, even when a pop-up button is depressed.

The present disclosure relates to subject matter contained in Japanese Utility Model Application No. HEI 05-074665, filed on Dec. 29, 1993, which is expressly incorporated herein by reference in its entirety.

What is claimed is:

1. A hot shoe system, for a camera having a pop-up internal strobe unit, positioned on the camera proximate to a hot shoe for mounting an external strobe, the system comprising:

means for determining whether one of a hot shoe cover and an external strobe unit is inserted in the hot shoe; and means for suppressing at least one operation of the pop-up internal strobe unit when a coupling base of said external strobe unit is inserted in the hot shoe and for enabling said at least one operation of the pop-up internal strobe unit when said hot shoe cover is inserted in the hot shoe.

2. The system according to claim 1, said at least one operation comprising a pop-up operation of the pop-up internal strobe unit.

3. The system according to claim 2, wherein said means for suppressing and for enabling at least one operation of the pop-up internal strobe unit further enables said at least one operation of the pop-up internal strobe unit when the hot shoe is empty.

4. The system according to claim 2, said means for suppressing and for enabling at least one operation of the pop-up internal strobe unit comprises a controller for controlling a pop-up actuator, said pop-up operation actuated by said pop-up actuator, and wherein said controller controls said pop-up actuator to enable actuating said pop-up operation when said hot shoe cover is inserted in the hot shoe or when the hot shoe is empty, and wherein said controller controls said pop-up actuator to disable actuating said pop-up operation when said external strobe is inserted in the hot shoe.

5. The system according to claim 4, said means for suppressing and for enabling at least one operation of the pop-up internal strobe unit further comprising a detection switch provided to the hot shoe.

6. The system according to claim 5, said detection switch comprises a pin extending into the hot shoe and a resilient contact switch actuatable by moving said pin from a neutral position.

7. The system according to claim 6, said coupling base of said external strobe unit comprises means for moving said pin from said neutral position when said coupling base of said external strobe is inserted into the hot shoe, and said hot shoe cover comprises means for avoiding said pin when hot shoe is inserted into the hot shoe.

8. The system according to claim 7, wherein said controller controls said pop-up actuator to enable actuating said pop-up operation when said pin is in said neutral position and to disable actuating said pop-up operation when said pin is moved from said neutral position.

9. The system according to claim 4, said pop-up actuator comprising an electromagnet.

10. The system according to claim 1, wherein said hot shoe cover is substantially planar.

11. The system according to claim 10, said hot shoe cover comprising a recess, said recess positioned in said hot shoe cover for permitting enabling of said at least one operation of the pop-up internal strobe unit.

12. The system according to claim 1, a side of said hot shoe cover opposite a direction of insertion of said hot shoe cover into said hot shoe having tabs extending in a direction perpendicular to the direction of insertion, said tabs covering an edge of said hot shoe when said hot shoe cover is inserted into said hot shoe.

13. A hot shoe system, for a camera having a pop-up internal strobe unit, positioned on the camera proximate to a hot shoe for mounting an external strobe, the system comprising:

a switch, provided to the hot shoe;

a hot shoe cover for insertion into the hot shoe, said hot shoe cover comprising a recess;

an external strobe unit comprising a coupling base, said coupling base arranged for insertion into the hot shoe;

means for activating said deactivating the pop-up internal strobe unit, said activating and deactivating means being responsive to said switch, wherein said switch is arranged such that said switch is not actuated when said hot shoe cover is inserted in the hot shoe, wherein said switch is arranged such that said switch is actuated when said coupling base of said external strobe unit is inserted in the hot shoe, and wherein said activating and deactivating means deactivate said internal strobe when said switch is actuated, and activate the pop-up internal strobe unit when said switch is not actuated.

14. The system according to claim 13, wherein said means for activating and deactivating the pop-up internal strobe unit extends the pop-up internal strobe unit away from a body of the camera when the pop-up internal strobe unit is activated.

15. The system according to claim 14, said means for activating and deactivating comprising an electromagnet.

16. The system according to claim 15, said switch comprising a pin extending into the hot shoe and a resilient contact switch actuatable by moving said pin from a neutral position.

17. The system according to claim 16, wherein said means for activating and deactivating enables activation when said pin is in said neutral position and enables deactivation when said pin is moved from said neutral position.

18. The system according to claim 13, wherein said hot shoe cover is substantially planar.

19. The system according to claim 18, said hot shoe cover comprising a recess positioned in said hot shoe cover so as not to actuate said switch.

20. The system according to claim 13, a side of said hot shoe cover opposite of a direction of insertion of said hot shoe cover into said hot shoe having tabs extending in a direction perpendicular to the direction of insertion, said tabs covering an edge of said hot shoe when said hot shoe cover is inserted into said hot shoe.

\* \* \* \* \*

UNITED STATES PATENT AND TRADEMARK OFFICE
CERTIFICATE OF CORRECTION

PATENT NO. : 5,565,941
DATED : October 15, 1996
INVENTOR(S) : Hidefumi KANEKO

It is certified that error appears in the above-indentified patent and that said Letters Patent is hereby corrected as shown below:

At column 6, line 15 (claim 6, line 2), change "comprises" to ---comprising---.

Signed and Sealed this

Fifteenth Day of April, 1997

Attest:

BRUCE LEHMAN

*Attesting Officer*     *Commissioner of Patents and Trademarks*